Figure 1:
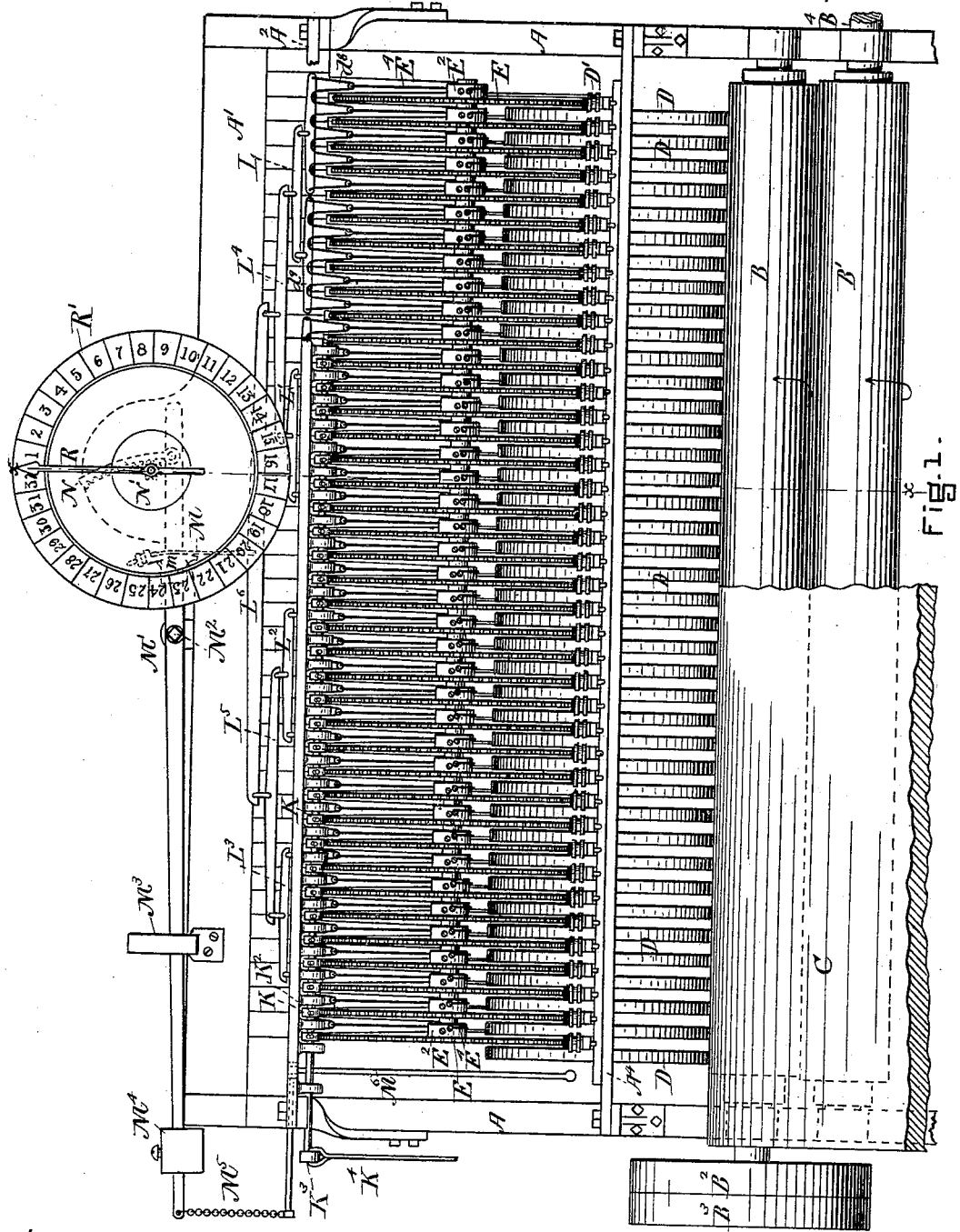

(No Model.)  5 Sheets—Sheet 1.

W. A. SAWYER.
MACHINE FOR MEASURING THE AREA OF SURFACES.

No. 329,596.  Patented Nov. 3, 1885.

WITNESSES
INVENTOR (No Model.)　　　　　　　　　　　　　　　　　　　5 Sheets—Sheet 2.
W. A. SAWYER.
MACHINE FOR MEASURING THE AREA OF SURFACES.

No. 329,596.　　　　　　　　　　　Patented Nov. 3, 1885.

WITNESSES

INVENTOR (No Model.) 5 Sheets—Sheet 3.

W. A. SAWYER.

MACHINE FOR MEASURING THE AREA OF SURFACES.

No. 329,596. Patented Nov. 3, 1885.

WITNESSES
H. E. Barry
Albert H. Spear

INVENTOR
Wm. H. Sawyer
by W. B. H. Downs
Atty.

N. PETERS. Photo-Lithographer, Washington, D. C.

(No Model.)

W. A. SAWYER.

MACHINE FOR MEASURING THE AREA OF SURFACES.

No. 329,596. Patented Nov. 3, 1885.

WITNESSES
H. E. Barry
Albert W. Spear

INVENTOR
Wm. A. Sawyer
By Wm. W. H. Doane
Atty.

(No Model.) 5 Sheets—Sheet 5.

W. A. SAWYER.
MACHINE FOR MEASURING THE AREA OF SURFACES.

No. 329,596. Patented Nov. 3, 1885.

WITNESSES

INVENTOR

UNITED STATES PATENT OFFICE.

WILLIAM ARTHUR SAWYER, OF DANVERSPORT, ASSIGNOR TO THE SAWYER LEATHER MACHINERY COMPANY, OF BOSTON, MASSACHUSETTS.

MACHINE FOR MEASURING THE AREAS OF SURFACES.

SPECIFICATION forming part of Letters Patent No. 329,596, dated November 3, 1885.

Application filed May 9, 1885. Serial No. 164,885. (No model.)

*To all whom it may concern:*

Be it known that I, WILLIAM A. SAWYER, of Danversport, in the county of Essex and Commonwealth of Massachusetts, have invented certain new and useful Improvements in Machines for Measuring the Areas of Surfaces, of which the following is a specification.

My invention relates to improvements in machines for measuring and registering the superficial areas of sheets, (more especially those of irregular outline, such as hides and skins,) in which a greater or less number of a series of traction or measuring wheels revolving in contact with a roller are raised according to the varying width of the article passed through, each traction-wheel measuring lineally the length of surface that passes under it, and being so raised by its movement actuates a device for winding up a cord or the like, whereby its peripheral movement is accurately transmitted. The amount of cord wound up by the different wheels, or the amount of each wheel's peripheral movement, is transmitted to a system of levers, which in turn transmit their aggregate motion to an indicating-dial.

The details of the general construction of the machine to which my present improvements relate are fully set forth in Letters Patent of the United States granted to me—viz., No. 256,058, of 1882, No. 269,962, of 1883, No. 286,078, of 1883, and in an application, No. 166,645, filed May 25, 1885, now pending in the United States Patent Office.

My present invention consists in the combination, with traction or measuring wheels provided with pinion-hubs, of gear-wheels to the shaft of which is attached a friction-hub, which is provided with a cord or chain which serves to transmit the motion of the measuring or traction wheels to the pulleys on the system of aggregating-levers.

Besides the above improvements, I have likewise made a number of others, which will be more fully hereinafter set forth in connection with the full description of the mechanical construction of my machine.

Figure 2:
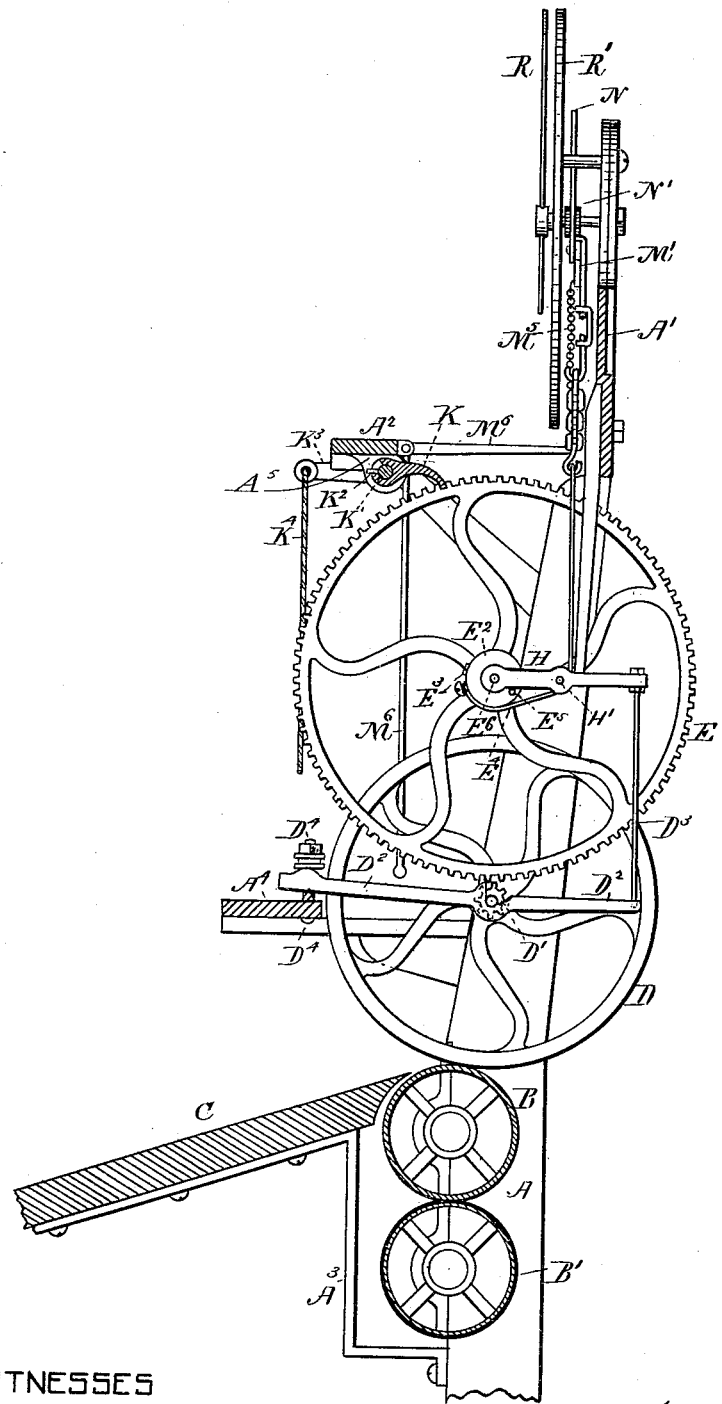
Figure 3:
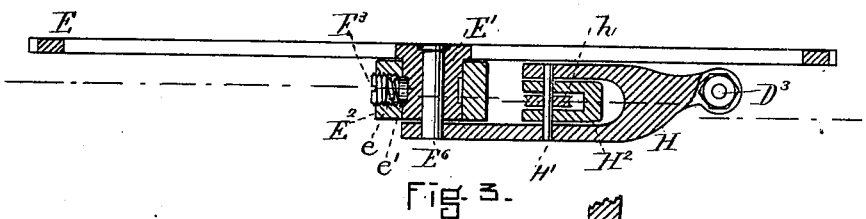
Figure 4:
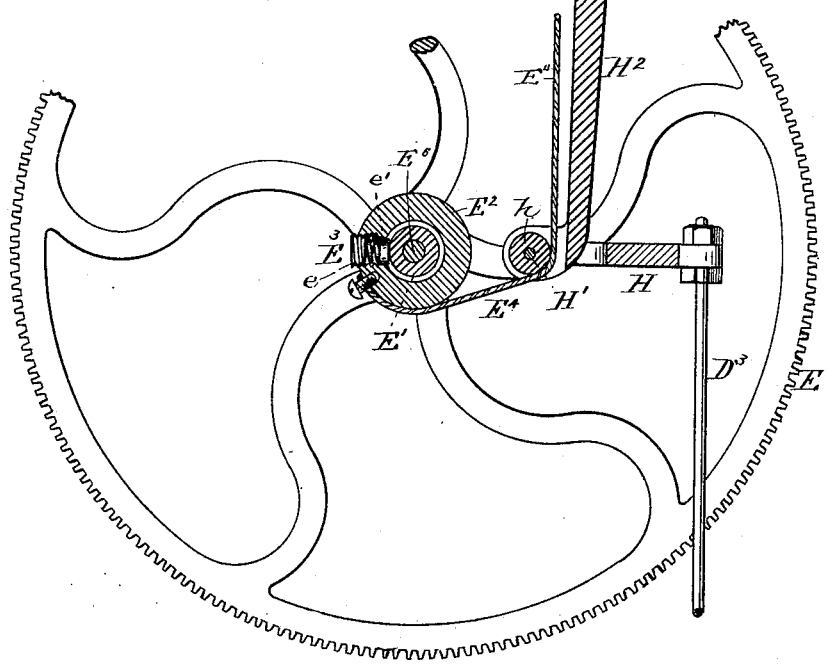
Figure 5:
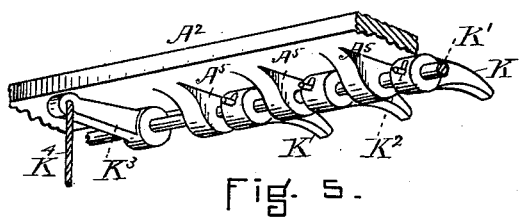
Figure 6:
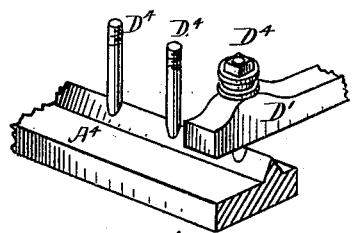
Figure 7:
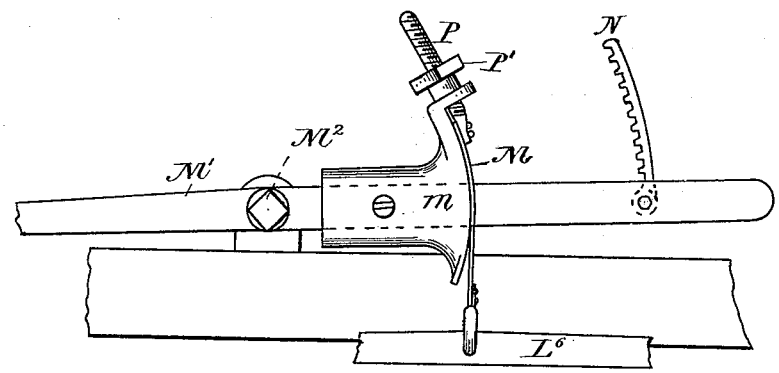
Figure 8:
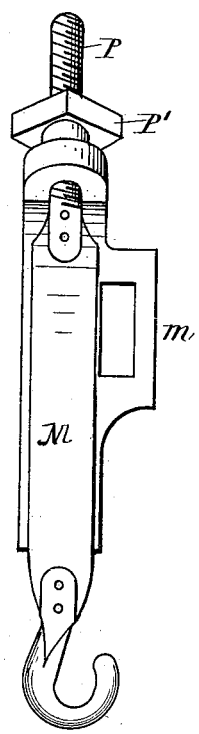
Figure 11:
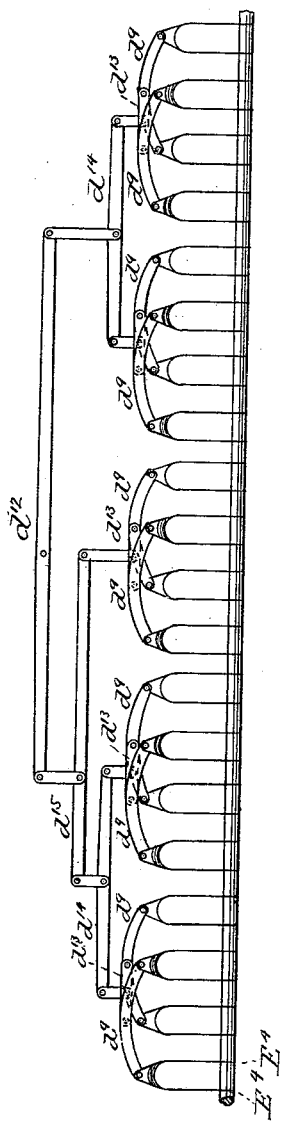
Figure 9:
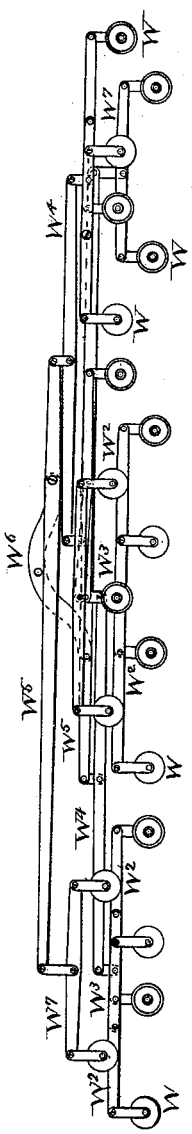
Figure 10:
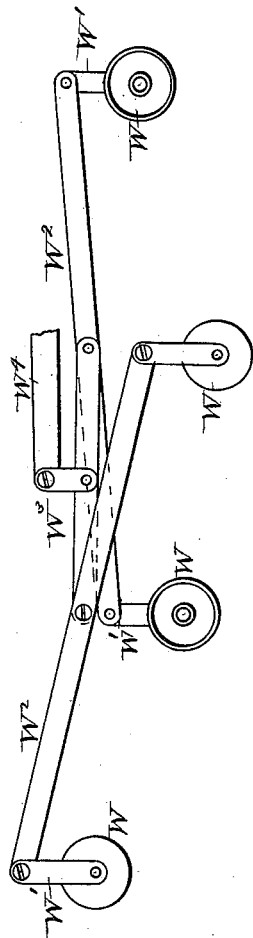

In the accompanying drawings, Figure 1 is a front elevation of my improved machine. Fig. 2 is a cross-vertical section on the line $x$ $x$ of Fig. 1, showing some of the parts in elevation. Fig. 3 is a cross horizontal section on a horizontal line drawn through the center of the wheel E of Fig. 4. Fig. 4 is a sectional view in detail of the hub of the wheel E and its support, showing the friction-collar and its connections. Fig. 5 is a perspective view in detail of a part of the system of pawls which act on the gear-wheels E E. Fig. 6 is a perspective view showing in detail the means by which the lever D', carrying the measuring and traction wheels D, are fulcrumed on a knife-edge. Fig. 7 is a front elevation in detail of the device I preferably use to immediately connect the system of aggregating-levers, hereinafter spoken of, to the lever M'. Fig. 8 is an elevation showing the strap M and its connection to the curved piece $m$. Fig. 9 shows my system of levers and pulleys. Fig. 10 shows one set of pulleys and their connecting-levers. Fig. 11 is a modification to take the place of the system of pulleys and levers shown in Fig. 9.

A A, Figs. 1 and 2, represent the upright supports of the frame of the machine; and A' A² A⁴ are longitudinal cross-beams, extending from one end of the machine to the other, and serve for supports for the smaller parts of the machine.

B and B' are rolls, one of which, B, feeds in the article to be measured, and the other, B', which is covered with some soft material, serves as a cleaner or wiper to remove any accumulation of dirt that may lodge on the feed-roll B. To the shaft of the feed-roll B are connected the fast and loose pulleys B² B³. To the shaft of the wiper-roll B' may be attached a pulley at B⁴, to move it in the same direction with that in which the feed-roll B moves.

C is an apron for convenience in feeding the stock to be measured.

D D, Figs. 1 and 2, are both traction and measuring wheels, and are so supported or so adjusted in their housings as to be free to move up or down, so as to rest either on the feed-roll B or on the article being measured. Each of these wheels D D is free to revolve independently of any other, and is also free to move up and down.

Upon each of the measuring and traction wheels D, I place a pinion, D', Fig. 2, whose office is to engage with the gear-wheel E (when there is any article on the feed-roll B of sufficient thickness to lift the measuring and traction wheel to such a height, and through the lever D², rod D³, and lever-support H, Fig. 2, lower the gear-wheel E to such an extent that the two will come in contact) and cause it to revolve. As the gear-wheel is made to revolve only when the thing to be measured is under the measuring and traction wheel, it is evident that the amount of motion imparted to the said gear is in proportion to the length traversed by the measuring and traction wheel D on the surface to be measured, as is fully set forth in my former patents referred to above.

Attached to each of the hubs E' of the gear-wheels E is the friction-pulley E², (see Figs. 2, 3, and 4,) the amount of friction being determined by the set-screw E³, which presses upon a spring, e, the inner end of which bears upon a metal plug, e'. (See Fig. 4.) The friction between the hub E' and the pulley E² is sufficient to cause it to revolve with the gear E and draw down the cord or chain E⁴ and operate a system of levers, L L' L² L³ L⁴ L⁵ L⁶, Fig. 1, the operation and arrangement of which are fully described in the said Letters Patent heretofore granted to me.

E⁵, Fig. 2, is a pin or stop on the friction-pulley determining its normal position—that is, the friction-pulley is pulled back until the pin E⁵ comes in contact with the lever-support H. The last lever, L⁶, of the system is connected by a strap, M, of any suitable material, preferably of metal, to a lever, M', Figs. 7 and 8, the lever M' being pivoted at M², and is provided with a curved piece, m, Figs. 7 and 8, for the strap M to work upon, thus securing an even leverage in all positions of the lever M'.

N is a curved rack which engages with a pinion on the axis of the pointer R to move and indicate on the dial R' the amount of motion of the lever M'. (See Fig. 1.) P' is an adjusting-nut on the screw P, which is attached to the end of the strap M. (Shown in Fig. 8.) As the adjusting-nut P' is moved upward or downward on the screw P against the curved piece m, the strap M is lowered or raised.

When one operation of measuring has been completed, the system of levers L L' L² L³ L⁴ L⁵ L⁶ will be drawn down and the pointer R will indicate the area measured. Now, to place the levers back in their original positions the operator pulls the cord M⁵ either by taking hold of it directly or through the bent rod M⁶. This action will also revolve all of the friction-pulleys E² (which have been moved) about their hubs and leave them in place for the next operation.

M³, Fig. 1, is a bracket-piece attached to the frame of the machine and serves to keep the lever M' in place.

M⁴, Fig. 1, is a counter-weight to keep the levers in place.

Attached to the longitudinal bar A², Figs. 1, 2, and 5, I have a series of pawls, K, one for each of the gears E. Each pawl K is pivoted on a rod, K', and secured by a pin, K², which works in a slot made in the rear end of the pawl, so that the pawl may have a slight motion independently of the rod K'.

K³ is an arm attached to the rod K', and has a cord, K⁴, by which it may be operated.

By the above device all of the pawls K may be freed from the gears E by simply pulling down the cord K⁴.

A⁵ are lugs or brackets on the under side of the bar A², which support the rod K'. These pawls K serve to hold the gear-wheels accurately in position after they have wound up on their hubs the cords E⁴ until the indications of the dial are registered. They also serve to hold the gear-wheels positively while the friction-pulleys E² E² are revolved back into their normal position.

The advantages attained by the use of these friction-pulleys are that the gear-wheel does not have to be moved after an operation of measuring has taken place, but can continue simply round and round in the same direction, thus utilizing equally all the teeth of the gear-wheel and avoiding the noise occasioned by the dropping of the toothed segments heretofore used by me.

The means by which I support the gear-wheels in my present machine are shown in Figs. 2, 3, and 4. To the cross-bar A², I attach the arms H² by a bolt and nut, providing one arm for each gear-wheel. The support H is pivoted to the arm H² by a pin, H', as shown in Fig. 3. On the pin H' is placed a pulley, h, upon which the cord E⁴ runs. The gear-wheel E turns on a headed pin, E⁶, which is rigidly connected with the lever-support H. It is thus seen that each gear-wheel is independently supported on a lever-support, H, fulcrumed at H'.

In Fig. 6 I have shown in detail the manner in which I fulcrum on a knife-edge the lever D²; D⁴ being the bolt-connecting the lever D' with the bar A⁴.

I have previously shown in my former patents, above mentioned, several arrangements of levers. In Fig. 9 I have shown an arrangement of levers which are so constructed as to occupy very small compass when in operation. In this arrangement, when the system of levers is in its proper position in the machine, the lever W⁶ should be pivoted at its center direct to the strap M. At each end of the lever W⁶ are pivoted the main-lever arms W⁵ W⁵, W⁶ being interposed between the longer arms of W⁵. At the longer arm of the lever W⁵ is pivoted by a link a simple lever, W⁷, having pivoted at each end a grooved wheel or pulley. On the shorter arm of W⁵ is pivoted an arm, W⁴, at the inner ends of which are pivoted a small system of levers.

(Shown in Fig. 10.) At the smaller ends of $W^4$ are pivoted a small system of levers of the general arrangement, as shown in Fig. 10, but of different proportion, as hereinafter described.

W W represent grooved wheels or pulleys, which are supported by the links $W'$, which are connected to the ends of the small levers $W^2$. These small levers $W^2$ are connected by a short lever, $W^3$, which is connected at its center by a link or arm to $W^4$. In this arrangement one cord from each pair of friction pulleys or hubs extends around a pulley or wheel, W. It is necessary for the wheels W to be in their normal position on a horizontal line running through their centers. As the wheels W are arranged relatively to the hubs of the gear wheels or segments, which wind up the cords $E^4$, and as these hubs are arranged on a line equal distances from each other, it follows that the wheels W must be arranged on a line at equal distances from each other.

In Fig. 9 I have shown an arrangement of the wheels W in which they are supposed, when in a line, to be just three inches apart from center to center. In order to have the wheels W at equal distance from each other, it is necessary to so arrange the length of the levers relatively to each other as to produce this result. Supposing, then, the wheels W to be, when in a line, just three inches apart, the system of levers attached to the outer ends of the lever $W^4$ will be as follows: $W^3$ will be nine inches long, pivoted at its center, while $W^2$ will be twelve inches long, pivoted at its center. This causes the two inner wheels of the system to be just three inches apart and each six inches from the outer wheel or pulley, giving room for the lever $W^7$, which is nine inches long, to drop its pulley W between the outer and inner pulley of $W^2$. The system of pulleys at the inner end of $W^4$ is shown in accurate proportion in Fig. 10, where $W^3$ is six inches in length and pivoted at its center to $W^4$, and $W^2$ is twelve inches in length, pivoted at its center to $W^3$, thus bringing the wheels W, when in line, six inches apart, and allowing room for a similar set of four wheels to drop into position between these four pulleys at the proper distances from each other.

When the system of levers shown in Fig. 11 is in its proper position in the machine, the lever $d^{12}$ should be pivoted directly to the strap M at the point distant from its left-hand end, as shown in Fig. 11, of two-fifths of its length. The arrangement of the levers otherwise in Fig. 11 is obvious from the description heretofore given in my previous patents.

I claim as my invention—

1. The combination, with a series of traction-wheels having toothed hubs, and a series of gear-wheels located over these hubs, of pivoted lever-supports for said gear-wheels and for said traction-wheels, said pivoted lever-supports being connected, whereby the position relatively to each other of said toothed hubs and their corresponding gear-wheels is controlled, all arranged and operating substantially as described.

2. The combination, with a registering device, of a weighted lever-arm, a series of aggregating-levers, a series of cords, a series of gear-wheels, and a series of traction or measuring wheels having toothed hubs and resting on a roller, and adapted to be raised by the passage of an article whose area is to be measured, so that these toothed hubs engage and set in motion the gear-wheels, which transmit their motion by cords to the system of aggregating-levers, all arranged substantially as described.

3. The combination of a series of traction-wheels having toothed hubs and a series of gear-wheels located over these hubs, and friction hubs or pulleys for these gear-wheels, having an adjustable friction device and a stop to determine their normal position, so that the friction-pulleys revolve with the gear-wheels, and are readily pulled back into their normal position, substantially as and for the purpose set forth.

4. In a machine for measuring the area of surfaces, the combination of a registering device, consisting, preferably, of a dial, pointer, axis, and pinion, with the system of aggregating levers, by means of a weighted lever-arm provided with a curved rack to engage with the pinion on the axis of the pointer of the registering device, and also with a curved piece having a strap attached thereto to engage with the system of aggregating-levers, whereby an even leverage is secured in all positions of the weighted lever-arm, substantially as described.

5. In a machine for measuring the area of surfaces, a system of aggregating-levers, the two main levers $W^5$ $W^5$ of which are connected by a curved lever, $W^6$, interposed between the two longer arms of the two said main levers, which arms are provided with a simple lever, $W^7$, having pivoted at each end a grooved wheel or pulley, while on each of the shorter arms is pivoted a lever, $W^4$, at the ends of which is pivoted a lever, $W^3$, which have pivoted in turn at each of their ends the levers $W^2$, which are each provided with a grooved wheel or pulley, all proportioned and operated substantially as described.

6. The combination of the graduated scale, its pointer, with a weighted lever-arm provided with a curved rack to engage the pinion on the shaft of the pointer, and connected to the system of aggregating-levers, which are connected to the hubs of gear-wheels, the traction-wheels having toothed hubs and resting on a roller, the pawls acting on the gear-wheels, and wiping-roll, all arranged together substantially as described, and for the purpose set forth.

7. The combination, with a series of traction-wheels having toothed hubs and a series of gear-wheels located over these hubs, of supports for these gear-wheels, consisting of a lever, H, pivoted to the supporting-arm H², substantially as described.

8. In a machine for measuring the area of surfaces, a system of aggregating-levers, in combination with a transmitting-lever, the said system of levers and transmitting-lever being connected by a device consisting of a curved bracket attached to the transmitting-lever, and provided with a strap adjustably attached at one end to the curved bracket and at the other end to the system of aggregating-levers, whereby, with said transmitting-lever, an even leverage is secured, substantially as described.

9. In a machine for measuring the areas of surfaces, the combination of a system of gear-wheels free to move up and down, provided with friction-collars adapted to wind up cords, and a system of pawls pivoted on a rod and secured thereto by a pin which works in a slot made in the rear end of the pawl, with the lever M', connected by suitable mechanism to said cords, whereby the said gear-wheels are held firmly in position while the friction-hubs are pulled back to the zero-point, substantially as described.

10. In a machine for measuring the area of surfaces, the combination of a bent rod attached to a weighted lever, the said weighted lever, a system of aggregating-levers, a series of cords attached to the friction hubs or pulleys of gear-wheels, and a series of friction-hubs or pulleys of gear-wheels, whereby all of said friction-pulleys moved are revolved back simultaneously into their normal position, substantially as described.

11. In a machine for measuring the areas of surfaces, a series of gear-wheels provided with friction hubs or pulleys, having an adjustable friction device and a stop to determine their normal position, in combination with lever-supports for said gear-wheels, substantially as described.

12. In a machine for measuring the areas of surfaces, the combination of a registering device, a weighted lever-arm, a system of aggregating-levers, a series of cords, a series of gear-wheels, and a series of traction or measuring wheels resting on a roller, with a series of pawls acting on said series of gear-wheels, all arranged and operated substantially as described, and for the purpose set forth.

13. The combination of a registering device, a weighted lever-arm, a system of aggregating-levers, a series of cords, a series of gear-wheels, and a series of traction or measuring wheels resting on a roller, all arranged and operated substantially as described, and for the purpose set forth.

14. In a machine for measuring the areas of surfaces, a rod secured by brackets to a cross-beam of the machine, in combination with a series of pawls pivoted on said rod, which is provided with an arm positively fixed thereto, the said pawls being individually secured to said rod by a pin positively fixed in said rod, and which works in a slot made in the rear end of the pawl, whereby the said pawls have a slight individual movement independent of each other, and are all positively operated by said arm, substantially as described.

In witness whereof I have hereunto set my hand.

WILLIAM ARTHUR SAWYER.

Witnesses:
WM. B. H. DOWSE,
H. E. BARRY.